Patented Sept. 1, 1936

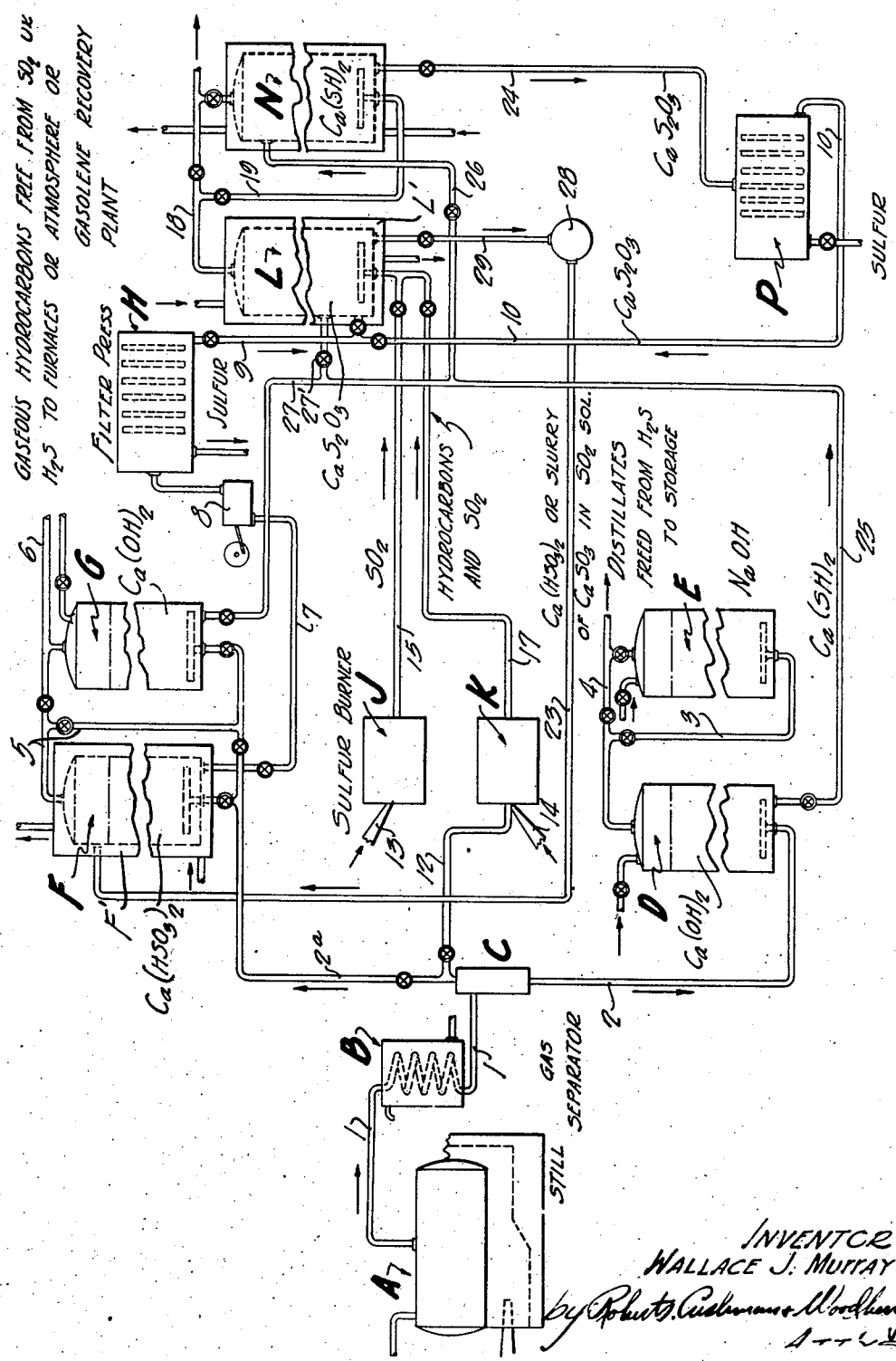

2,052,892

UNITED STATES PATENT OFFICE 2,052,892

PROCESS FOR THE RECOVERY OF SULPHUR FROM ITS COMBINATIONS WITH HYDROGEN OR OXYGEN

Wallace J. Murray, Reading, Mass., assignor to Arthur D. Little, Incorporated, Cambridge, Mass., a corporation of Massachusetts Application June 27, 1932, Serial No. 619,426

24 Claims. (Cl. 23—225)

This invention relates to the art of treating hydrogen sulphide and/or sulphur dioxide, whether occurring in gaseous or liquid mixtures, and more particularly to a method for the separation of these gaseous sulphur compounds from industrial or waste gases in which their presence creates an industrial nuisance or lowers the utility value of the gases with which they are admixed.

The desirability of accomplishing the result to which my process is directed is apparent and well recognized in such industries as the refining of petroleum, the manufacture of industrial heating gases, the distribution of natural gas, and for the economical recovery and prevention of dispersion of obnoxious sulphur compounds in various branches of the chemical industry. While the process is herein described with specific reference to the disposal of hydrogen sulphide from petroleum refinery gases and distillates, it will be understood that no limitation is thereby intended or implied. On the contrary, the process is of very general utility and its application to a variety of uses will hereafter be indicated.

Among the salient objects of this invention are to mentioned: (1) to provide an efficient and practical process for handling a wide variety of gases in which hydrogen sulphide occurs in low or high percentage, which shall involve the use of simple apparatus only; (2) to provide an economical process in the sense of avoiding the use of expensive chemicals; (3) to provide for the cyclic regeneration of the chemical agents made use of; (4) to avoid the use of sensitive or expensive catalysts; (5) to provide for the recovery of sulphur as a valuable by-product and in a preferred form. A particular object of this invention (to accomplish which its application will be described in detail) is to eliminate the industrial nuisance now associated with the refining of certain crude petroleums containing a relatively high percentage of sulphur, of which the crude petroleum of Crane County, west Texas, is an example.

The hydrogen sulphide content of the refinery gas fluctuates sharply over wide limits, with the result that a close balance between contents of hydrogen sulphide and sulphur dioxide can not practically be attained. It is therefore impractical directly to apply the well known reaction:

(1) 

which has heretofore been proposed as of utility for the immediate amelioration of sulphur gas nuisances and the recovery of sulphur. So far as I am aware, practical success in these objects by use of the reaction of Equation (1) above has not heretofore been attained. The present invention accomplishes in substance the promotion of this reaction through simple ancillary reactions, the end result of which accomplishes the result which would be effected by the direct reaction of hydrogen sulphide and sulphur dioxide (if such reaction could be practically carried out) to produce water and sulphur.

In alkali works and similar places a gas containing a constant content of H₂S may be evolved at a constant rate. Under these conditions the H₂S may be burned to sulphur in the presence of a catalyst. The Claus kiln, which has been in use for many years, is an example of this case. The reaction involved is:

(2) 

In petroleum gases the H₂S content and the rate of gas evolution are very variable and this makes it impossible to maintain the ratio of 2H₂S:1O₂, and, therefore, this familiar process can not be used satisfactorily.

The chemical reactions preferred to be relied upon for the purpose of the invention are susceptible of general statement. Depending upon whether hyrogen sulphide, in the general case, or sulphur dioxide is to be disposed of as in excess in the materials to be treated, the recommended treatment provides for the generation of one or the other of these sulphur compounds in such proportion as to satisfy the Equation (1) above. It is, however, unnecessary to maintain this balance at all times, as would be the case if sulphur dioxide and hydrogen sulphide occurring in that mixture were caused to react directly. The process now to be described is cyclic, in the sense that the chemical reagents used in one step are substantially regenerated in a form for reuse in the following operation.

The process of the invention as applied to hydrogen sulphide, which is the more usual form of such waste sulphur gases, includes the preliminary reaction of the same upon an acid sulphite of an alkaline earth metal such as calcium bisulphite, or a mixture of calcium sulphite, bisulphite and sulphurous acid, which results in the formation of the thiosulphate. This is readily and completely soluble in water, especially so long as the solution is kept cool and is not subjected to heating or concentration. In the presence of sulphur dioxide or sulphurous acid the thiosulphate reacts to produce polythionates, especially when cold and dilute. Upon subjecting the solution, per se, to increased concentration, however, or to heating, or both, the soluble thiosulphate is decomposed to free sulphur and normal calcium sulphite more completely than by acidification. The calcium sulphite may then be partially or completely dissolved in sulphurous acid to form the acid sulphite or bisulphite and used over again. Alkali metal sulphites, on the contrary, form thiosulphates which are not decomposable in this manner and hence are not applicable for the purpose. The recommended practice, therefore, includes in order reactions according to the following equations:

(3) $Ca(HSO_3)_2 + 2H_2S = 3H_2O + CaS_2O_3 + 2S$
(4) $CaS_2O_3 = CaSO_3 + S$
(5) $CaSO_3 + H_2O + SO_2 = Ca(HSO_3)_2$

Equation (3) represents the known reaction between calcium bisulphite ($Ca(HSO_3)_2$) solution and hydrogen sulphide ($H_2S$) to form calcium thiosulphate ($CaS_2O_3$) which is quite soluble in water, and elementary sulphur as a precipitate. So far as I am aware, Equation (4) represents a reaction which has not heretofore been utilized in a technical process although well known as a chemical reaction. Through the mechanism of this reaction there is obtained a regeneration of the reagent, first to normal calcium sulphite and then, by reaction with sulphurous acid or water and sulphur dioxide (according to Equation (5)) to calcium bisulphite, which may again be made use of in the reaction of Equation (3). Reactions (3) and (5) should take place at relatively low temperatures to prevent the decomposition of $Ca(HSO_3)_2$ and to increase the solubility of the gases $H_2S$ and $SO_2$. Reaction (4) is favored by high temperatures as $CaS_2O_3$ is moderately stable at low temperatures. The summation of reaction according to Equations (3), (4), and (5) gives a reaction according to Equation (1) upon the elimination of the reagent substances recovered by reaction according to (5) as $Ca(HSO_3)_2$, which is thereupon returned to reaction (3). It follows that practice of reactions (3), (4) and (5) in order produces the results of reaction according to Equation (1) with the advantage of effecting reaction with the $H_2S$ and the $SO_2$ severally. This provides for quantitative adjustment in said stages severally.

In practice, the simple balancing of Equations (3), (4) and (5) may not be fully realized when the balance of two $H_2S$ to one $SO_2$ is maintained, owing to certain side reactions which will either precipitate calcium in the form of an insoluble compound or yield other salts of sulphur acids which should be periodically purged from the cyclic system. For example, under certain conditions, such as acidification or reaction with sulphur dioxide before decomposing the thiosulphate there will be formed polythionates, which will not react similar to simple calcium thiosulphate made use of in Equations (4) and (5). But the thiosulphate solution may be substantially completely decomposed by heat or concentration to form $CaSO_3$ and S according to reaction (4). The thiosulphate may be similarly decomposed by acidification and heating or concentrating. To such extent as reactions to polythionates may occur, with consequent loss of reagents, it will be found convenient to replenish the working solutions of calcium thiosulphate by performing the following reactions, which start with calcium hydroxide or milk of lime, and utilizing their products:

(6) $Ca(OH)_2 + 2H_2S = Ca(SH)_2 + 2H_2O$
(7) $Ca(SH)_2 + 2SO_2 = CaS_2O_3 + 2S + H_2O$

The sulphur dioxide required by Equations (1), (5) and (7) may be produced by burning part of the gaseous hydrogen sulphide as:

(8) $2H_2S + 3O_2 = 2H_2O + 2SO_2$ or by burning part of the sulphur produced in the process as:

(9) $S + O_2 = SO_2$

Equation (6) represents the reaction between calcium hydroxide ($Ca(OH)_2$) and hydrogen sulphide to form calcium hydrosulphide ($Ca(SH)_2$); Equation (7), the reaction between calcium hydrosulphide and sulphur dioxide to form calcium thiosulphate, sulphur and water. In practice, if necessary, the replenishing of the reagents when depleted by side reactions or losses of other origin can be secured by making and substituting fresh batches in this simple and feasible way. These latter reactions are not, however, of basic importance in my process, and I recognize that their function may be served in other ways. Any reaction capable of yielding either calcium bisulphite or calcium thiosulphate can and may be employed in place of these suggested.

Having considered the general chemical aspects of this process and presented the specific reactions therein made use of, an application to a particular industrial problem, that of handling the large quantities of sulphurous gases as evolved in the refining of high sulphur crude petroleum will now be described in detail. The particular method now to be described is in itself another aspect of my present invention.

In the distillation of such crude petroleums as those from Crane County, Texas, the hydrogen sulphide problem presents itself in three phases. The first phase is in the liquid run down from the still, which is saturated with hydrogen sulphide. This is recommended to be taken from the bottom of a gas separator, and caused to flow upward through an appropriate scrubber filled with milk of lime. This removes the hydrogen sulphide as calcium hydrosulphide, which is used in a later step in the process; for example, a reaction according to Equation (6).

In the second phase hydrogen sulphide comes off in gases of high concentrations during a brief period of the batch distillation. In the case of continuous operation, gas highly inclusive of $H_2S$ will come off in an intermediate flash tower at about 400° F. This gas may be burned in an open flame, or if it is desired to save the hydrocarbons present, it may be mixed with air and burned in contact with iron oxide or other catalyst in a closed kiln. In this case the hydrogen sulphide will be preferentially burned, leaving the hydrocarbons unchanged. The sulphur dioxide produced in either way may be used in a later step in the process; for example, a reaction according to Equation (5) or (7) above.

In the third phase, the sour gas produced during the later part of the distillation process is handled. The hydrogen sulphide concentration during this phase is too low to permit efficient burning to sulphur dioxide, but it may be scrubbed either with milk of lime to give calcium hydrosulphide (according to Equation (6)), or with calcium bisulphite solution to give calcium thiosulphate (according to Equation (3)). It is evident that the lime and bisulphite should be allowed to react in separate scrubbers, since lime and bisulphite react to give insoluble normal calcium sulphite. A recommended practice is to cause the gases to go directly to the bisulphite scrubbers and then through a lime scrubber at the end of the system to react and combine with any hydrogen sulphide not absorbed by the bisulphite scrubbers. Calcium bisulphite may be used for scrubbing the liquids of the first phase, but its use for this purpose is not recommended since this would leave free sulphur in the oil. For a few special uses the presence of free sulphur in the oil is desirable, and in these uses the provision of bisulphite for liquid washing will be satisfactory.

A final step in the process is recommended to comprise scrubbing the sulphur dioxide out of the gases of combustion of the second phase by passage through scrubbers containing a solution of calcium sulphite (reaction of equation (5)) followed by passage through scrubbers containing calcium hydrosulphide (reaction of Equation (7)), of which the latter compound is the better absorbent for sulphur dioxide. Since the first reaction of sulphur dioxide on calcium hydrosulphide is to produce calcium thiosulphate, it is evident that a mixture of calcium hydrosulphide and calcium thiosulphate may be used in the scrubbers if desired.

The action of sulphur dioxide on calcium hydrosulphide produces free sulphur as well as calcium thiosulphate. The calcium thiosulphate thus obtained is soluble in water, per se, but upon acidification or concentrating or heating, decomposes to calcium sulphite and sulphur in accordance with Equation (4). It is significant that such solubility has not heretofore been fully recognized and, in fact, some of the more recently published solubility factors for this compound relate to warm or acidified solutions and give low solubilities, although the data of Kruman and Rodermund in Zeit. für Anorg. Chem. 86 373 (1914) show (and these data have been confirmed by experiment) that at 9° C. 29.34 parts by weight of $CaS_2O_3$ dissolve in 70.66 parts by weight of water, or approximately equal parts of the hydrated salt and of water. Such concentrated solutions,— or even more dilute solutions upon warming,— tend to decompose according to Equation (4) so that if the solutions are subsequently tested, they will show a very low solubility for the residual thiosulphate. On the other hand, if such solutions are treated with sulphur dioxide, and especially when cold and dilute, the thiosulphate is in large part converted to polythionates which are undesirable for the purposes of this invention, and may decompose still further into calcium sulphate. But if the thiosulphate solution is heated or concentrated, or both, the thiosulphate is decomposed to calcium sulphite and free sulphur, which are insoluble. It is not practicable, therefore, to filter the mixture. Upon treating with sulphur dioxide, the calcium sulphite is converted to bisulphite which is partly soluble,— though some sulphite tends to remain undissolved. It has been found, however, that sulphur may be readily and completely separated by filtration of the thiosulphate solution.

It is a further observation that if the thiosulphate be inadvertently transformed to polythionates, these may be converted back to the thiosulphate or to sulphite as follows:

(10) $CaS_4O_6 + CaS_3O_6 + 3Ca(SH)_2 \rightarrow 2CaS_2O_3 + 3CaSO_3 + 3H_2S$

(11) $CaS_4O_6 + CaS_3O_6 + 6H_2S \rightarrow 2CaS_2O_3 + 6H_2O + 3S$

It will be seen that the lime or other calcium compounds recommended to be employed in this process serve simply as carrier reagents which act as absorbing reservoirs in balancing the hydrogen sulphide and sulphur dioxide produced at variable rates and at different times during their conversion according to Equation (1) to water and elemental sulphur. Compounds of the alkali metals may not take the place of lime in this process since their thiosulphates do not decompose readily to sulphites which may react with sulphur dioxide to form bisulphites but slowly react to give trithionates or polythionates, which are useless in this process, but compounds of other alkaline earth metals, for example, magnesium, are operative. While sodium hydroxide, for an instance of use of an alkali metal compound, can not fully take the place of lime, this substance may be used to effect a slightly more thorough scrubbing of the liquids, and therefore a final soda lye scrub after the lime scrub may be desirably employed in some cases.

The small quantity of lime lost by side reactions may be made up by additions to the lime scrubber.

One form of apparatus and recommendation for practical carrying out of my process for the disposal of sulphur compounds occurring in petroleum will now be described with the aid of the accompanying drawing, in which the figure is a diagram and flow sheet, and in which:

A still and furnace A of any suitable type for vaporizing the oil is provided with a vapor line 1 to conduct vapors through a condenser B of any suitable type to a gas separator C from the bottom of which the liquid products are caused to flow through a line 2, and from the top of which the uncondensed gases flow through a line 2ª. Line 2 delivers to a scrubber D containing milk of lime through which the liquids are passed upwardly by gravity, and from which the liquid overflow through valved line 3 may pass to the bottom of a scrubber E containing a solution of sodium hydroxide, NaOH, through which the liquids freed from hydrogen sulphide pass upwardly to line 4 and to a receiver, not shown. Vapor or gas flow through line 2ª may be initially to scrubber F containing a solution of calcium bisulphite, through which the gases pass upwardly and through line 5 to another scrubber G containing milk of lime to receive and scrub the gases leaving scrubber F; the purified gaseous hydrocarbons free from hydrogen sulphide which may be utilized for heating or otherwise, flow off through line 6. Since the desired reaction in tank F corresponds to that indicated by Equation (3), and since it is desirable to promote therein a relatively high concentration of calcium thiosulphate, without reaction to the polythionates, it is desirable to provide a low temperature thereof, as by circulating a cooling medium through the outer jacket F'.

After a period of operation, the scrubber F contains liquor of calcium thiosulphate, $CaS_2O_3$, and finely divided sulphur in suspension; from time to time or continuously this liquor may be drawn off through line 7 and pump 8 to a filter press H for filtering the sulphur out of the thiosulphate liquor. The sulphur is withdrawn as shown and the filtered thiosulphate solution may be delivered to a sulphur dioxide scrubber L through line 9. Scrubber L may be thus supplied with calcium thiosulphate or may contain a mixture of calcium thiosulphate and calcium hydrosulphide, which products are formed at different stages in the process. Scrubber L may also be provided with a jacket L' for circulating a suitable heating medium, such as hot water or steam, to promote the progress of decomposition of the thiosulphate solution to sulphite and free sulphur, preferably in advance of the introduction of sulphur dioxide. The sulphur dioxide for such addition may be provided by a sulphur burner J with air inlet 70 13, the effluent sulphur dioxide being conducted to the chamber L through pipe 15.

Gases from separator C may flow through a valved line 12 joining line 2ª to a closed kiln K containing ferric oxide or other catalyst, for the selective combustion of hydrogen sulphide, the hydrocarbon and resultant $SO_2$ product flowing through line 17 to the bottom of scrubber L. The rate of production and quantity of $SO_2$ gas produced and acted upon in scrubber L is, of course, readily controllable. Since it is found that reaction according to Equation (5) is promoted by using relatively high concentrations of sulphur dioxide gas, such operations are preferably conducted when the concentration of hydrogen sulphide (or other sulphur components in the gases from separator C) is relatively great. Otherwise concentrated sulphur dioxide from the burner J is to be preferred. Liquor from scrubber L may be drawn off by pump 28 through pipe 29. The gasous flow past scrubber L through line 18 may be sent through branch 19 to the bottom of a scrubber N containing calcium hydrosulphide, $Ca(SH)_2$, supplied from absorption tank D through lines 25—26. The valved pipe 24 from scrubber N may lead to a filter press P for recovering sulphur from the educt reagent liquid from scrubber N which is essentially $CaS_2O_3$. Valved pipe 10 conducts this solution from filter press P to scrubber L where it is converted to bisulphite. Heat resulting from burning at J or at K may be utilized to dry the sulphur product, or otherwise, as desired.

In case of the formation of polythionates, through inaccuracies of operation or accumulation in the reagent cycle,—they may be regenerated in accordance with reaction of Equation (10) or (11) by the introduction of hydrogen sulphide gas into tank L or F (under conditions of high concentration of $H_2S$), or by introduction of calcium hydrosulphide solution thereto from line 25 by opening valve 27. The latter is preferable since the reaction is reversible and alkalinity favors thiosulphate formation.

A preferred operation is as follows:

The oil is vaporized in still A and the vapors formed thereby are conducted through vapor line 1 to condenser B, whereby the condensable constituents of the gas are liquefied. From the condenser B the liquid and uncondensed vapors are conducted through line 1 to the gas separator C. From the bottom of the gas separator C the liquids flow into the lower part of scrubber D, which contains milk of lime, which removes the hydrogen sulphide which is contained as an impurity in the distillates from the oil. The resulting product from the reaction of hydrogen sulphide and lime is calcium hydrosulphide. This reaction product is caused to flow from scrubber D through line 25 and branch 27 into scrubber L or through branch 26 into scrubber N. The liquids which have been scrubbed in scrubber D may be caused to flow through line 4 to the receiver house. If, however, all of the hydrogen sulphide has not been removed from the liquids in scrubber D, the liquids may be caused to flow through valved branch 3 into the lower part of scrubber E which contains a solution of sodium hydroxide and out at the top through line 4 to the receiver house. Suitable valves controlling the connecting lines may be provided as indicated in the diagram. More than one scrubber may be provided either for milk of lime or for sodium hydroxide within this invention.

During the early stages of treatment of a batch in still A, the uncondensed vapors contain a large amount of hydrogen sulphide, and these are recommended to be caused to flow from the top of gas separator C through line 12, through kiln K, containing ferric oxide or other suitable catalyst, and supplied with sufficient air through passage 14 so that the hydrogen sulphide will be preferentially oxidized and the hydrocarbons saved. In this case also the resulting gases, consisting of sulphur dioxide and hydrocarbons, are passed through line 17 into scrubber L. In either case, this stage of treatment results in utilizing the sulphur of the still gases to make calcium bisulphite in scrubber L, as well as free sulphur, to be recovered for by-product value.

In the later stages of treatment of a batch in still A, the vapors from gas separator C contain a greater proportion of hydrocarbons and a smaller proportion of hydrogen sulphide, and in this stage it is recommended that the gases be not burned; the gases are instead caused to flow through line 2ª either through scrubber F, containing calcium bisulphite, and then through scrubber G, containing milk of lime; or only through scrubber F; or only through scrubber G. If only scrubber F is used, line 5 is closed. If both scrubbers F and G are used, line 5 is open and lines 6 and 2ª closed between scrubbers F and G. If only scrubber G is used, lines 5 and 6 between F and G are both closed. In any of these cases, the scrubbed hydrocarbons are caused to flow through the exit line 6 to the boiler house, the atmosphere or to the gasoline recovery plant; they are substantially free of hydrogen sulphide.

The calcium bisulphite utilized in scrubber F is formed during the process in scrubber L, as above mentioned. The action of hydrogen sulphide on calcium bisulphite causes the formation of calcium thiosulphate and sulphur. The liquid containing these two products is caused to flow from scrubber F through line 7 to filter press H in which the sulphur is separated and is removed, and the calcium thiosulphate liquor may be caused to flow through line 9 to scrubber L.

In scrubber G the hydrogen sulphide and lime form calcium hydrosulphide, and this material may be caused to flow from scrubber G through lines 27 and 26 into scrubber N. The calcium thiosulphate for this scrubber or series of scrubbers is supplied from filter press H through line 9 as described above. The calcium hydrosulphide is supplied from scrubber D through line 25, and also from scrubber G through line 27.

The thiosulphate solution in scrubber L preferably is heated, by circulating hot water or steam through the jacket L', whereupon decomposition to normal calcium sulphite and free sulphur takes place. It is then treated with concentrated sulphur dioxide gas to convert the sulphite to more soluble form of bisulphite. The reaction need not be effective to convert all of the sulphite to bisulphite, since this will be promoted upon recycling to absorber F. It is, however, desirable to saturate the same thoroughly with sulphur dioxide gas, an appreciable proportion of which will dissolve as sulphurous acid without immediate reaction with the calcium sulphite. When the gas containing sulphur dioxide produced in kiln K is passed into scrubber L as described above, after passing through scrubber L, the mixture is purified and residual hydrocarbons may flow through line 18 to the atmosphere; or if they contain sufficient hydrocarbons for fuel, they may be delivered to the boiler house or any other place requiring fuel. The liquid containing calcium bisulphite, calcium sulphite, and sulphur may be caused to flow from scrubber L through line 29, pump 28 and line 23 into scrubber F.

In the second procedure, calcium thiosulphate and calcium hydrosulphide are run into and reacted upon in separate scrubbers L and N, respectively, the calcium thiosulphate in scrubber L and the calcium hydrosulphide in scrubber N. The gases containing sulphur dioxide are then passed through scrubber L and thence through line 19 into scrubber N and out through line 18 to the atmosphere or boiler house.

Since the calcium thiosulphate has previously been decomposed to calcium sulphite and free sulphur, the sulphur dioxide reacts with calcium sulphite in scrubber L to form calcium bisulphite. These products (calcium sulphite, calcium bisulphite and free sulphur) are now caused to flow back to scrubber F through lines 29 and 23, as above described. The residual gas (or original gas stream) then passes to scrubber N. The products formed in scrubber N are calcium thiosulphate and sulphur, and are caused to flow from scrubber N through line 24 to filter press P in which the sulphur is separated and removed. The calcium thiosulphate liquor may be caused to flow from filter press P through line 10 into scrubber L.

The drawing is a diagram only, and it will be understood that the apparatus may include at any point storage or relief tanks for gases or liquids circulated or utilized in the treatment described; that continuous as well as batch treatment of the materials to be deprived of their detrimental sulphur inclusions may be restorted to without substantial change except the provision of alternatively used vessels for the several stages of treatment, not shown. While the process has been described in connection with apparatus, it is apparent that apparatus capable of practicing the process may be provided by conventional design within the knowledge of those skilled in the art and informed by the disclosure of this specification. While the process has been described for a specific instance as carried out upon distillation products from heavily sulphuretted petroleum, the invention is applicable without change to the conversion and elimination of sulphur-bearing components of products of many other industrial efforts; for example, the smokes and fumes of metallurgical operations, coke ovens and other distillations.

This application is a continuation in part of co-pending application Serial No. 334,778, filed January 24, 1929.

I claim:

1. Process of treating gases containing hydrogen sulphide to remove sulphur compounds which comprises the steps, scrubbing the gases with a solution containing an alkaline earth metal bisulphite to form the corresponding thiosulphate and precipitated sulphur, and thereafter converting the thiosulphate so found to sulphur and sulphite, treating the latter to regenerate the bisulphite, and treating more gas with said bisulphite.

2. Process of treating gases containing hydrogen sulphide, which comprises scrubbing a part of such gases with a solution of an alkaline earth metal bisulphite, to form thiosulphate and precipitated sulphur, converting the hydrogen sulphide in another part of the gas to sulphur dioxide, subjecting the thiosulphate to decomposition to the corresponding sulphite and sulphur and thereafter treating the reaction mixture with said sulphur dioxide.

3. Process of treating gases containing hydrogen sulphide, which comprises scrubbing a part of such gases with a solution of an alkaline earth metal bisulphite, to form thiosulphate and precipitate sulphur, converting the hydrogen sulphide in another part of the gas to sulphur dioxide, subjecting the thiosulphate to decomposition by heat to the corresponding sulphite and sulphur and thereafter treating the reaction mixture with said sulphur dioxide.

4. Process of treating gases containing hydrogen sulphide, which comprises scrubbing a part of such gases with a solution of an alkaline earth metal bisulphite, to form thiosulphate and to precipitate sulphur, converting the hydrogen sulphide in another part of the gas to sulphur dioxide, subjecting the thiosulphate to decomposition by concentration to the corresponding sulphite and sulphur, and thereafter treating the reaction mixture with said sulphur dioxide.

5. Process of treating gases containing hydrogen sulphide, which comprises the steps, scrubbing the gases with a solution containing an alkaline earth metal bisulphite to form the corresponding thiosulphate, and precipitate sulphur, removing the sulphur and decomposing the thiosulphate solution so formed with heat to the corresponding sulphite and sulphur and then treating with sulphur dioxide to regenerate the bisulphite.

6. Process of treating gases containing hydrogen sulphide, which comprises the steps, scrubbing the gases with a solution containing calcium bisulphite to form calcium thiosulphate, and precipitate sulphur, removing the sulphur and decomposing the thiosulphate solution so formed with heat to the corresponding sulphite and sulphur and then treating with sulphur dioxide to regenerate the bisulphite.

7. Process of removing the sulphur content from gases containing hydrogen sulphide, which comprises scrubbing a part of said gases with a solution of calcium bisulphite, to form calcium thiosulphate and sulphur, removing the latter, decomposing the thiosulphate to sulphite and free sulphur, converting the sulphur components in a part of said gases to sulphur dioxide and reacting upon the sulphite with said sulphur dioxide to form bisulphite.

8. Process of removing the sulphur content from gases containing hydrogen sulphide comprising scrubbing the gases with a solution of calcium bisulphite to form calcium thiosulphate and free sulphur, removing the latter, decomposing the thiosulphate to sulphite and sulphur, converting the sulphur components in a part of said gases to sulphur dioxide, reacting upon the sulphite with said sulphur dioxide to form bisulphite and returning the liquid product to the scrubbing operation.

9. Process of removing the sulphur content from gaseous admixture containing hydrogen sulphide, comprising as steps severally causing sulphur dioxide to react with an alkaline earth metal sulphite to form bisulphite, and hydrogen sulphide to react with the bisulphite of an alkaline earth metal to form thiosulphate, and decomposing the thiosulphate to sulphite, and subjecting the bisulphite and sulphite products respectively to the action of the gaseous admixture and to the action of sulphur dioxide to regenerate the said thiosulphate and bisulphite respectively.

10. Process of removing the sulphur content from gaseous admixture containing hydrogen sulphide, comprising as steps severally causing sulphur dioxide to react with calcium sulphite to form bisulphite, and hydrogen sulphide to react with calcium bisulphite to form thiosulphate, and decomposing the thiosulphate to sulphite, and subjecting the bisulphite and sulphite repectively in aqueous solution or suspension to the action of the gaseous admixture and to the action of sulphur dioxide to regenerate the said thiosulphate and bisulphite respectively.

11. In a process for removing hydrogen sulphide from vapors and gases, the step of promoting an eventual reaction between the hydrogen sulphide and sulphur dioxide through their stage interaction with an alkaline earth metal bisulphite and an alkaline earth metal sulphite, respectively, in aqueous solution or suspension, the reaction in each regenerating material for the solution in the other, with intermediate decomposition of thiosulphate generated by the action of the hydrogen sulphide on the bisulphite and removal of sulphur.

12. The process of recovering sulphur from petroleum, which consists in distilling the same whereby the bulk of the sulphur present will be evolved as hydrogen sulphide either dissolved in the liquid condensates or present in the still gases, separating the liquid condensate from the gases so liberated, scrubbing the distillation products in part with calcium bisulphite liquor, while converting the remaining part of the gaseous hydrogen suphide to sulphur dioxide and absorbing the sulphur dioxide in calcium sulphite, thereby to generate further calcium bisulphite.

13. The process of recovering sulphur from petroleum, which consists in distilling the same whereby the bulk of the sulphur present will be evolved as hydrogen sulphide either dissolved in the liquid condensates or present in the still gases, separating the liquid condensate from the gases so liberated, scrubbing the distillation products in part with calcium sulphite and bisulphite while converting the remaining part of the gaseous hydrogen sulphide to sulphur dioxide and treating calcium sulphite therewith to generate further calcium bisulphite.

14. The process of recovering sulphur from petroleum, which consists in distilling a crude oil containing sulphur, converting the hydrogen sulphide of the gaseous component from the first stage of the distillation to sulphur dioxide, and thereafter causing the sulphur dioxide to react with alkaline earth metal sulphite to form the bisulphite which is then reacted with hyrogen sulphide contained in the gaseous efflux from the last stage of distillation to form thiosulphate and sulphur.

15. The process of recovering sulphur from petroleum, which consists in distilling a crude oil containing more than one percent of sulphur, burning the hydrogen sulphide evolved in the first stage of the distillation to form sulphur dioxide, and absorbing this sulphur dioxide in a suspension containing calcium sulphite, said sulphite resulting from the reaction of the hydrogen sulphide of the leaner gases of the last stage of the distillation on a solution containing calcium bisulphite, and decomposition of the resulting calcium thiosulphate, thereby to regenerate calcium bisulphite.

16. Process of treating gases containing hydrogen sulphide to remove sulphur compounds, which comprises the steps, scrubbing the gases with a solution containing an alkaline earth metal bisulphite and sulphur dioxide, and adding to the resulting liquor alkaline earth metal hydrosulphide to promote the formation of the corresponding thiosulphate and sulphur.

17. Process of treating gases containing hyrogen sulphite to remove sulphur compounds, which comprises the steps, scrubbing the gases with a solution containing an alkaline earth metal bisulphite and sulphur dioxide, and adding to the resulting liquor alkaline earth metal hydrosulphide to promote the formation of the corresponding thiosulphate and sulphur, separating the sulphur, and decomposing the thiosulphate to sulphite and free sulphur.

18. Process of treating gases containing hydrogen sulphide, which comprises the steps, scrubbing the gases with a solution containing an alkaline earth metal bisulphite to form the corresponding thiosulphate, and precipitate sulphur, removing the sulphur and decomposing the thiosulphate solution so formed by heat and concentration to the corresponding sulphite and sulphur and then treating with sulphur dioxide to regenerate the bisulphite.

19. Process of removing the sulphur content from a gaseous admixture containing hydrogen sulphide and sulphur dioxide in which the sulphur dioxide predominates, comprising as steps subjecting the gaseous mixture to prolonged intimate contact with an aqueous suspension of alkaline earth metal sulphite and adding alkaline earth metal sulphhydrate to said aqueous suspension.

20. Process of removing the sulphur content from a gaseous admixture containing hydrogen sulphide and sulphur dioxide in which the hydrogen sulphide predominates, comprising as steps subjecting the gaseous mixture to prolonged intimate contact with an aqueous suspension of alkaline earth metal sulphite and adding sulphurous acid to the aqueous suspension.

21. Process of removing the sulphur content from gaseous and liquid products containing hydrogen sulphide, comprising as steps subjecting the same to contact with alkaline earth metal bisulphite to form alkaline earth metal thiosulphate, decomposing the thiosulphate to sulphite and sulphur and reconverting the sulphite to bisulphite for reuse.

22. Process of removing the sulphur content from gaseous and liquid products containing hydrogen sulphide, comprising as steps subjecting the same to contact with calcium bisulphite to form calcium thiosulphate, decomposing the thiosulphate to sulphite and sulphur, and reconverting the sulphite to bisulphite for reuse.

23. Process of recovering the sulphur content from gaseous and liquid products containing sulphur dioxide, comprising as steps converting the sulphur dioxide to alkaline earth metal thiosulphate and polythionate, and reacting upon the latter with alkaline earth metal hydrosulphide to form the corresponding thiosulphate therefrom.

24. Process of recovering the sulphur content from gaseous and liquid products containing sulphur dioxide, comprising as steps converting the sulphur dioxide to calcium thiosulphate and polythionate, and reacting upon the latter with calcium hydrosulphide to form the corresponding thiosulphate therefrom.

WALLACE J. MURRAY.